United States Patent
Pick et al.

(10) Patent No.: US 12,199,812 B2
(45) Date of Patent: Jan. 14, 2025

(54) ENHANCED ANALYSIS AND REMEDIATION OF NETWORK PERFORMANCE

(71) Applicant: CenturyLink Intellectual Property LLC, Broomfield, CO (US)

(72) Inventors: Edward Pick, Miami, FL (US); Jordan Markley Kubias, Wichita, KS (US); Ryan Miller, Villa Park, IL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 151 days.

(21) Appl. No.: 18/058,204

(22) Filed: Nov. 22, 2022

(65) Prior Publication Data

US 2023/0188408 A1     Jun. 15, 2023

Related U.S. Application Data

(60) Provisional application No. 63/265,399, filed on Dec. 14, 2021.

(51) Int. Cl.
*H04L 41/0631* (2022.01)
*H04L 41/0604* (2022.01)
*H04L 41/16* (2022.01)
*H04L 43/0817* (2022.01)

(52) U.S. Cl.
CPC ...... *H04L 41/0631* (2013.01); *H04L 41/0627* (2013.01); *H04L 41/16* (2013.01); *H04L 43/0817* (2013.01)

(58) Field of Classification Search
CPC . H04L 41/0627; H04L 41/0631; H04L 41/16; H04L 43/0817
USPC ........................................................ 709/224
See application file for complete search history.

(56) References Cited

U.S. PATENT DOCUMENTS

| | | | | |
|---|---|---|---|---|
| 10,680,875 | B2* | 6/2020 | Tapia | H04L 41/16 |
| 2017/0310546 | A1* | 10/2017 | Nair | H04W 24/08 |
| 2018/0270126 | A1* | 9/2018 | Tapia | H04L 43/065 |
| 2019/0036795 | A1* | 1/2019 | Ouyang | G06N 20/00 |
| 2019/0163553 | A1* | 5/2019 | Ramegowda | G06F 16/3344 |
| 2020/0162341 | A1* | 5/2020 | Vasseur | H04L 67/104 |
| 2020/0186411 | A1* | 6/2020 | Ravichandran | H04L 41/0668 |
| 2020/0259700 | A1* | 8/2020 | Bhalla | H04L 41/16 |
| 2020/0396147 | A1* | 12/2020 | Han | H04L 43/16 |
| 2021/0176146 | A1* | 6/2021 | Vasseur | H04L 41/145 |
| 2021/0184958 | A1* | 6/2021 | Kolar | H04L 43/08 |
| 2021/0344745 | A1* | 11/2021 | Mermoud | G06N 3/08 |
| 2022/0141096 | A1* | 5/2022 | Chien | H04L 41/142 709/223 |
| 2022/0294686 | A1* | 9/2022 | Triplet | H04W 12/06 |

(Continued)

*Primary Examiner* — David P Zarka

(57) ABSTRACT

This disclosure describes systems, methods, and devices related to identification and assessment of security threats to a computer system using zero trust security. A method may include receiving, at a policy enforcement device of a computer network, first data from a first subsystem of the computer network; receiving, at the policy enforcement device, second data from a second subsystem of the computer network, the first subsystem different than the first subsystem; identifying, by the policy enforcement device, based on a comparison of at least one of the first data or the second data to a security policy, a security threat to the computer network; and causing, by the policy enforcement device, a threat intelligence device of the computer network to determine a risk of the security threat.

14 Claims, 5 Drawing Sheets

(56) References Cited

U.S. PATENT DOCUMENTS

2022/0318082 A1\* 10/2022 Slinger ............... G06F 11/2263
2022/0358005 A1\* 11/2022 Saha ..................... G06F 40/216

\* cited by examiner

ENHANCED ANALYSIS AND REMEDIATION OF NETWORK PERFORMANCE

CROSS-REFERENCE TO RELATED APPLICATION

This application is related to and claims priority under 35 U.S.C. § 119(e) from U.S. Patent Application No. 63/265,399, filed Dec. 14, 2021, titled "ENHANCED ANALYSIS AND REMEDIATION OF NETWORK PERFORMANCE," the entire content of which is incorporated herein by reference for all purposes.

TECHNICAL FIELD

Embodiments of the present invention generally relate to systems and methods for analyzing and responding to network performance metrics.

BACKGROUND

The impact of network performance metrics is changing. At a given time, some network performance metrics may be more indicative of network performance than other network performance metrics, and some network performance metrics may be related to each other. Analysis of network performance metrics and remediation of issues indicated by network performance metrics may be inefficient due to a lack of recognition of network performance root causes, relationships between network performance metrics, and lack of network performance prediction based on network performance metrics.

SUMMARY

A centralized networks analytics model may execute in a server (e.g., a cloud-based network), collecting network performance data from a variety of network sources. The centralized networks analytics model may perform data management (e.g., to collect and curate network data), generate and assess provider performance data (e.g., baseline metrics, provider performance data, and remediation analytics), monitor and ensure network health (e.g., evaluating device health data, service compliance data, quality of service data, and baseline data), provide automation (e.g., alerts, incident management data, network interface data, and device operation status data), develop operations use cases (e.g., flap monitoring, lifecycle monitoring, capacity management data, provider outage correlation data, and service level agreement violation data), and performing security assessments (e.g., failed login data, user access data, anomaly detection, and network attack data).

The centralized networks analytics model may identify performance issues and their root causes, and may implement remediation actions to address the root causes. The centralized networks analytics model may analyze the network performance data in an automated fashion, predicting a network problem before the problem occurs, identifying the root cause of network problems, identifying and assessing remediation options, and recommending and/or implementing automatically remediation options. For example, the centralized networks analytics model may use natural language processing of the text of syslog data to generate new network performance metrics, and may determine which network resources are the most important to monitor for performance at any given time. The centralized networks analytics model may use machine learning (e.g., convolutional neural networking, deep neural networking, etc.) to learn which network performance metrics are the most predictive and/or determinative at a given time, which performance metrics may be related to a common root problem, and which remediation options to implement or recommend.

The centralized networks analytics model may execute in real-time in a network edge device as software as a solution (SaaS). A user may log into the centralized networks analytics model, and the centralized networks analytics model may access the user's system to identify its devices and data for analysis.

DETAILED DESCRIPTION

Figure 1:
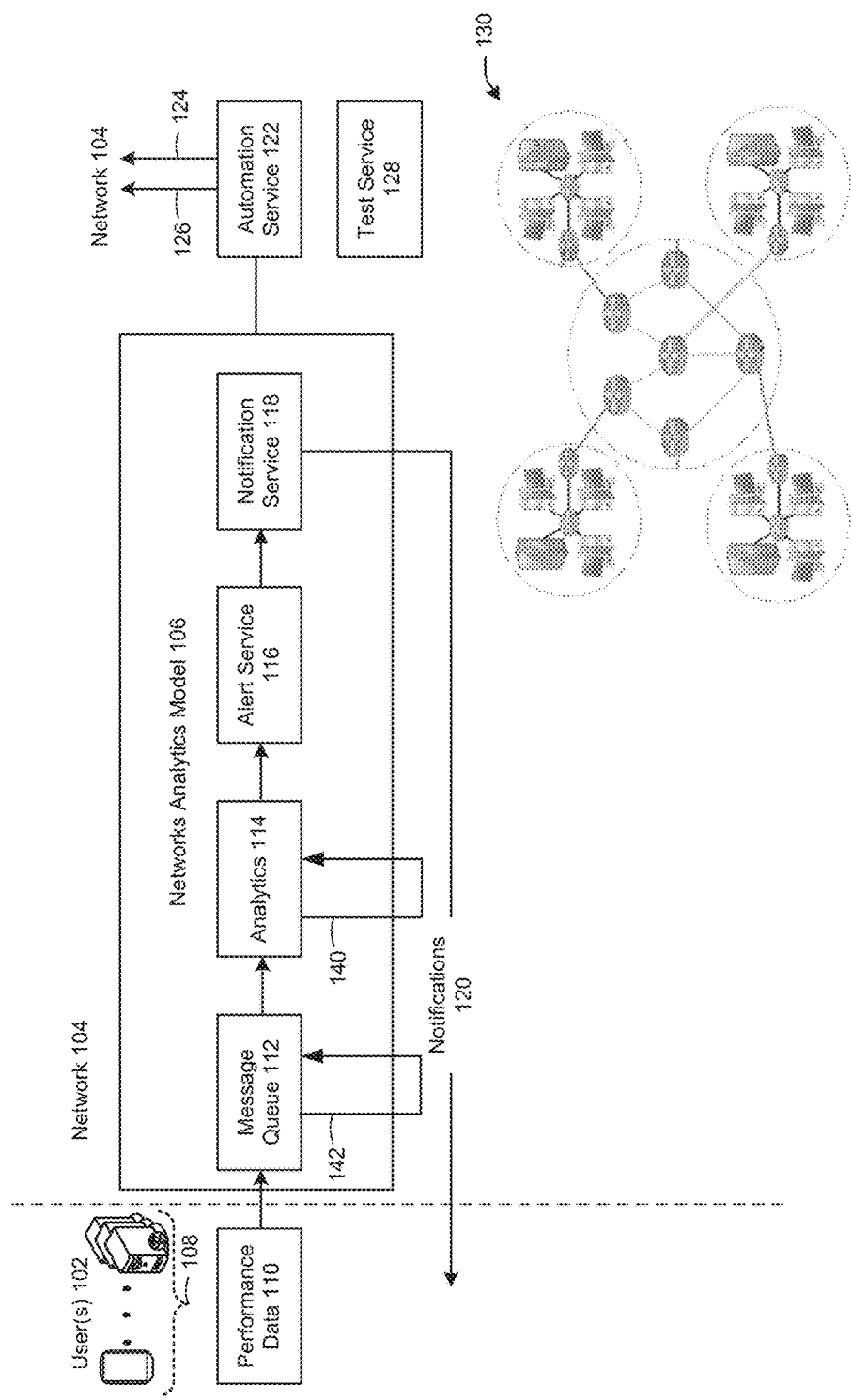
FIG. 1 illustrates an exemplary network analysis environment in accordance with one embodiment.

Aspects of the present disclosure involve systems, methods, and the like, for identifying and predicting network performance issues, and remediating the issues by addressing the root causes of the network performance issues.

With a dynamic employment environment in which people increasingly are working remotely from their physical offices, computer network performance has shifted significantly. Network performance metrics that, in the past, may have been strong indicators of network performance may no longer be as strongly indicative, and different network performance metrics may be more indicative of network performance at different times. Some network performance issues may have increased, while others may have decreased. Network managers may invest resources based on network utilization and performance, so the identification of performance and utilization of certain parts of a network is crucial.

Automated systems that analyze network performance may be trained to emphasize certain network performance metrics over other network performance metrics, and the metrics for certain network nodes and other equipment over others. However, as network use changes, some network performance metrics may become more important to analyze than others, and some network resources may be more prone to performance issues than others, resulting in a need to re-prioritize network analysis on-the-fly. For example, more remotely working employees may result in increased network performance issues in network resources that previously did not experience many performance issues. A cloud transition may change workload and utilization metrics, and may affect network capacity management. An automated system may monitor all routers of a network, but may not identify the most important routers to monitor at a given time.

Some automated systems may identify network performance issues, but may not predict performance issues before they occur, recognize the root cause, or relate one poor performance with another poor performance. For example, multiple network nodes may experience poor performance concurrently, which may be the result of another resource's poor performance or a network outage. Some automated systems may identify the individual performance issues without linking them to a common root cause (e.g., the other resource's poor performance or the network outage), and may identify the performance issues only after they occur.

There is therefore a need for enhanced analysis and remediation of network performance.

In one or more embodiments, a centralized networks analytics model may execute on a cloud-based server or edge device of a network, and may function as software as a solution (SaaS). The centralized networks analytics model may use analytic accelerators to evaluate a variety of network performance data from a variety of sources to identify and predict performance issues, correlate related network performance issues, identify root causes of network performance issues, remediate the network performance issues, and recommend remediation actions in response to the network performance issues. For example, the accelerators may include a network inventory visualization of network devices with the capability to present a location, count, neighboring devices, and configuration of network devices. The accelerators may include a network health accelerator to monitor quality of service (QoS) metrics (e.g., jitter, delays, packet loss, etc.) to identify and validate the performance of a network. The accelerators may include a use-case performance with near real-time data processing. Other accelerators may include, but are not limited to, flap monitoring, outage correlation, and lifecycle monitoring.

In one or more embodiments, a user may sign into (e.g., authenticate to) the centralized networks analytics model. Software for the model may access the user's system (e.g., with user consent and in compliance with relevant laws), and may identify network devices and receive network data for analysis and predictions. The centralized networks analytics model may be trained to monitor and emphasize certain metrics and resources over others, as some metrics may present a stronger correlation to known performance issues, and some devices may be more likely to experience or lead to performance issues than other devices. The model may be trained and may adjust its criteria, such as weight values for certain metrics and resources, as the model receives operator feedback regarding whether performance issues actually occurred, the root causes of the performance issues, and the like.

In one or more embodiments, using one or more application programming interfaces (APIs), the centralized networks analytics model may receive network data, such as syslog data, infrastructure management data, Ethernet/Internet Protocol data, and network configuration settings. Text data, such as from the syslog data, may be analyzed using natural language processing, for example, to generate performance metrics for analysis. The centralized networks analytics model may prioritize the data to analyze based on its source and/or type, which may adjust over time due to training data and/or feedback. When performance data are trending in a manner that indicates a future performance issue is plausible, the centralized networks analytics model may predict the performance issue and search for its root cause. For example, when one network device's performance metrics experience poor performance (e.g., based on comparisons of performance metrics to respective thresholds, such as utilization thresholds, packet loss thresholds, signal-to-noise thresholds, latency thresholds, jitter thresholds, packet error thresholds, and the like, indicating a metric is too high or low for intended performance), the centralized networks analytics model may search for other devices with which the network device may communicate, and may analyze the other devices for possible performance issues or trends toward possible performance issues. The centralized networks analytics model may continue tracing poor performance metrics through multiple levels of devices to identify a root cause—one or more devices whose actions or inactions are causing performance issues at other devices. Similarly, the centralized networks analytics model may use provider outage data to identify when poor network performance of one or more devices may be caused by known outages, such as planned shutdowns or re-routing, or unexpected outages (e.g., due to weather, construction, etc.). In this manner, when multiple network resources experience the same performance issue (e.g., their same performance metrics are outside of baseline ranges indicating acceptable performance), such may indicate that the multiple network resources are experiencing or may experience a same network performance issue. Rather than analyzing, reporting, and/or remediating each performance issue, the centralized networks analytics model may correlate the issues to one another, and may identify the root cause(s) of the performance issue, reducing the resources needed for analysis and remediation.

In one or more embodiments, the centralized networks analytics model may determine which network data are to remain remote or is to be input into an analytics tool. The determination may be based on performance reasons (e.g., some data may be more likely to indicate a performance issue than other data), compliance reasons (e.g., personal information included in the data, location-based rules governing data use, etc.), or user settings/selections of which data to analyze or ignore in the analysis.

In one or more embodiments, the centralized networks analytics model may use a data manager to collect and curate performance data from different sources. The centralized networks analytics model may rely on baseline metrics for different types of performance data and devices to use in comparison (e.g., to identify when performance data are unusual and/or indicative of a performance issue). For example, the baseline metrics may define latency and/or transmission rate in a geographic region. The centralized networks analytics model may identify reusable use cases to apply for different users and situations, for example, to detect performance issues and anomalies.

In one or more embodiments, the centralized networks analytics model may identify remediation options. For example, the centralized networks analytics model may determine that packet re-routing is an option to avoid a performance issue, may select a different network circuit for use, update packet priorities, and the like. The centralized networks analytics model automatically may implement the remediation and report to a user that the remediation has been implemented, or may assess and report remediation options to a user for selection.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an exemplary network analysis environment 100. One or more users 102 of a network 104 may access a centralized networks analytics model 106 (e.g., implemented in an edge device of the network 104), and the centralized networks analytics model 106 may access the devices 108 and performance data 110 of the one or more users 102. For example, the network 104 may provide network services, cloud-based services, telecommunications services, and the like to the one or more users 102. The services may be provided using various circuits for different geographic regions, each having a variety of devices (e.g., nodes), for example, to send, receive, generate, analyze, route, and present traffic to user devices.

Figure 3:
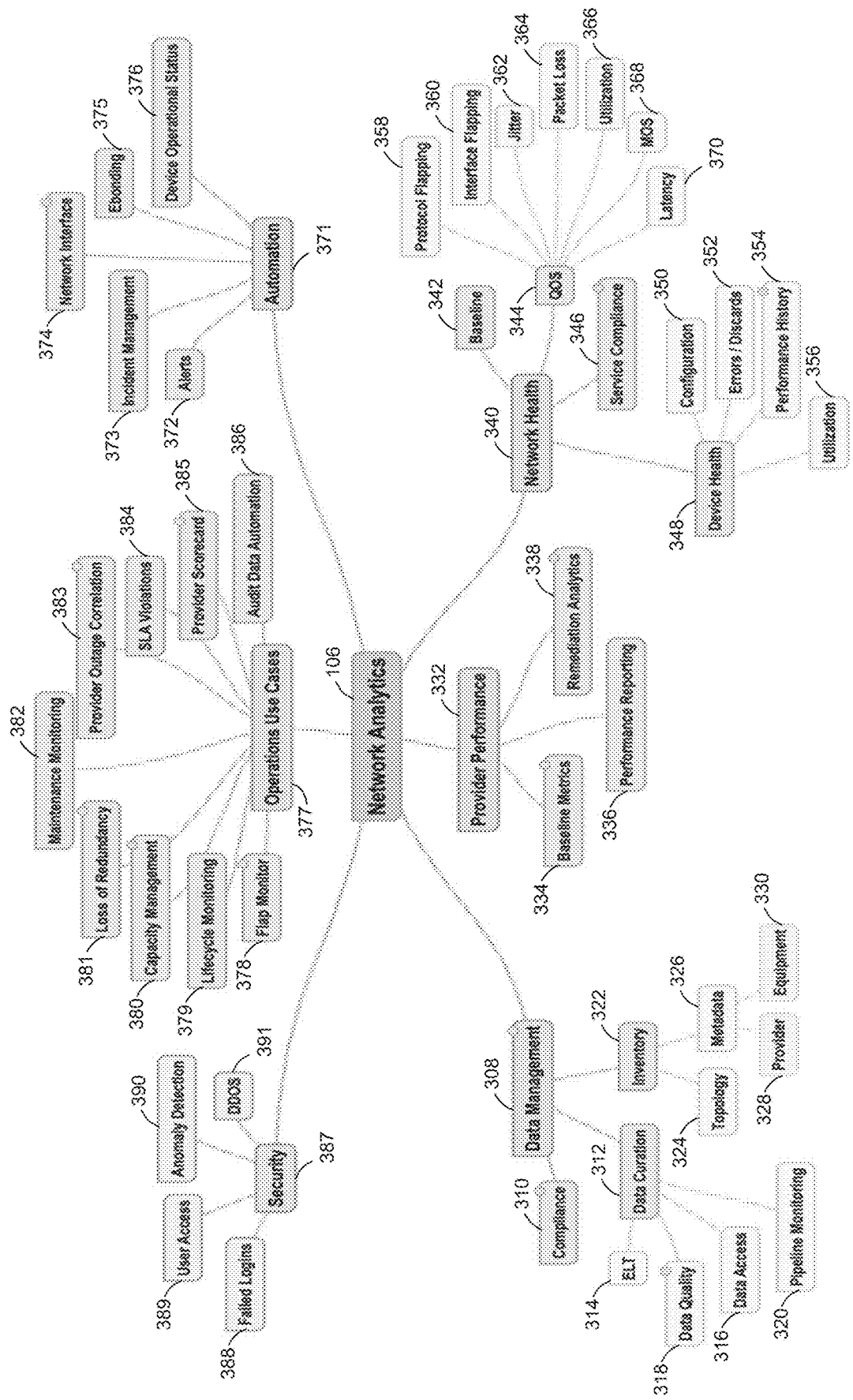
FIG. 3 illustrates example data and functions for a network analysis environment in accordance with one embodiment.

The centralized networks analytics model 106 may include a message queue 112 to receive the performance data 110 from the one or more users 102 (and other sources as shown in FIG. 3), an analytics layer 114 to analyze the performance data 110 (e.g., by comparing the performance data 110 to threshold values, models, and use cases, and identifying and predicting performance issues and their root causes and relationships), an alert service 116 to generate alerts for when performance issues are predicted or identified, and a notification service 118 to provide notifications 120 to the one or more users 102 (e.g., providing options to remediate identified or predicted performance issues and/or to summarize any remediation actions performed by the centralized networks analytics model 106).

When the centralized networks analytics model 106 detects or predicts a performance issue with the network 104, an automation service 122 may generate service tickets 124 indicating the detected or predicted performance issue, and may send notifications 126 indicating the detected or predicted performance issue. The automation service 122 may track the status of the service tickets 124 to determine when the service tickets 124 have been addressed (e.g., when resolution has completed). Once the service ticket 124 has been addressed (e.g., in an automated fashion and/or using human operators), a test service 128 may test one or more circuits 130 where the performance issue is predicted or detected. The one or more circuits 130 may be modified in some manner as part of the remediation (e.g., the response to the service ticket 124). Once the testing indicates that a circuit 130 does not experience the detected or predicted performance issue, or is no longer predicted to experience the performance issue, the automation service 122 may close the service ticket 124, and the network configuration of the circuit 130 may return to its original configuration (e.g., the pre-remediation configuration).

In one or more embodiments, the centralized networks analytics model 106 may execute on a cloud-based server or edge device of the network (e.g., the computing system 500 of FIG. 5), and may function as SaaS. The centralized networks analytics model 106 may use analytic accelerators at the analytics layer 114 to evaluate a variety of network performance data 110 from a variety of sources (e.g., from the user devices 108 and from sources as shown in FIG. 3) to identify and predict performance issues, correlate related network performance issues, identify root causes of network performance issues, remediate the network performance issues, and recommend remediation actions in response to the network performance issues. For example, the accelerators may include a network inventory visualization of network devices with the capability to present a location, count, neighboring devices, and configuration of network devices.

In one or more embodiments, the one or more users 102 may authenticate to the centralized networks analytics model 106. Software for the centralized networks analytics model 106 may access the user's system (e.g., the devices 108), and may identify network devices and receive network data for analysis and predictions. The analytics layer 114 may be trained to monitor and emphasize certain metrics and resources (e.g., of the performance data 110) over others, as some metrics may present a stronger correlation to known performance issues, and some devices may be more likely to experience or lead to performance issues than other devices. The analytics layer 114 may adjust its criteria, such as weight values for certain metrics and resources, as the model receives operator and/or automated feedback 140.

In one or more embodiments, using one or more APIs, the messaging queue may receive network data, such as syslog data, infrastructure management data, Ethernet/Internet Protocol data, and network configuration settings. Text data, such as from the syslog data, may be analyzed by the analytics layer 114 using natural language processing, for example, to generate performance metrics for analysis. The analytics layer 114 may prioritize the data to analyze based on its source and/or type, which may adjust over time due to training data and/or feedback 142. When performance data are trending in a manner that indicates a future performance issue is plausible, the centralized networks analytics model 106 may predict the performance issue and search for its root cause. For example, when one network device's performance metrics experience poor performance (e.g., based on comparisons of performance metrics to respective thresholds, such as utilization thresholds, packet loss thresholds, signal-to-noise thresholds, latency thresholds, jitter thresholds, packet error thresholds, and the like, indicating a metric is too high or low for intended performance), the analytics layer 114 may search for other devices with which the network device may communicate, and may analyze the other devices for possible performance issues or trends toward possible performance issues. The analytics layer 114 may continue tracing poor performance metrics through multiple levels of devices to identify a root cause—one or more devices whose actions or inactions are causing performance issues at other devices. Similarly, the centralized networks analytics model 106 may use provider outage data to identify when poor network performance of one or more devices may be caused by known outages, such as planned shutdowns or re-routing, or unexpected outages (e.g., due to weather, construction, etc.).

In one or more embodiments, the centralized networks analytics model 106 may determine which network data are to remain remote or is to be input into the analytics layer 114. The determination may be based on performance reasons (e.g., some data may be more likely to indicate a performance issue than other data), compliance reasons (e.g., personal information included in the data, location-based rules governing data use, etc.), or user settings/selections of which data to analyze or ignore in the analysis.

In one or more embodiments, the centralized networks analytics model 106 may rely on baseline metrics for different types of performance data and devices to use in comparison (e.g., to identify when performance data are unusual and/or indicative of a performance issue). For example, the baseline metrics may define latency and/or transmission rate in a geographic region. The centralized networks analytics model 106 may identify reusable use cases to apply for different users and situations, for example, to detect performance issues and anomalies.

In one or more embodiments, the centralized networks analytics model 106 may identify remediation options. For example, the centralized networks analytics model 106 may determine that packet re-routing is an option to avoid a performance issue, may select a different network circuit for use, update packet priorities, and the like. The centralized networks analytics model 106 automatically may implement the remediation and report to a user (e.g., using the notification service 118) that the remediation has been implemented, or may assess and report remediation options to a user for selection.

In one or more embodiments, the one or more users 102 may have network operations, network management, service provider management, and capacity planning that are reliant on the analysis and remediation performed by the centralized networks analytics model 106.

Figure 2:
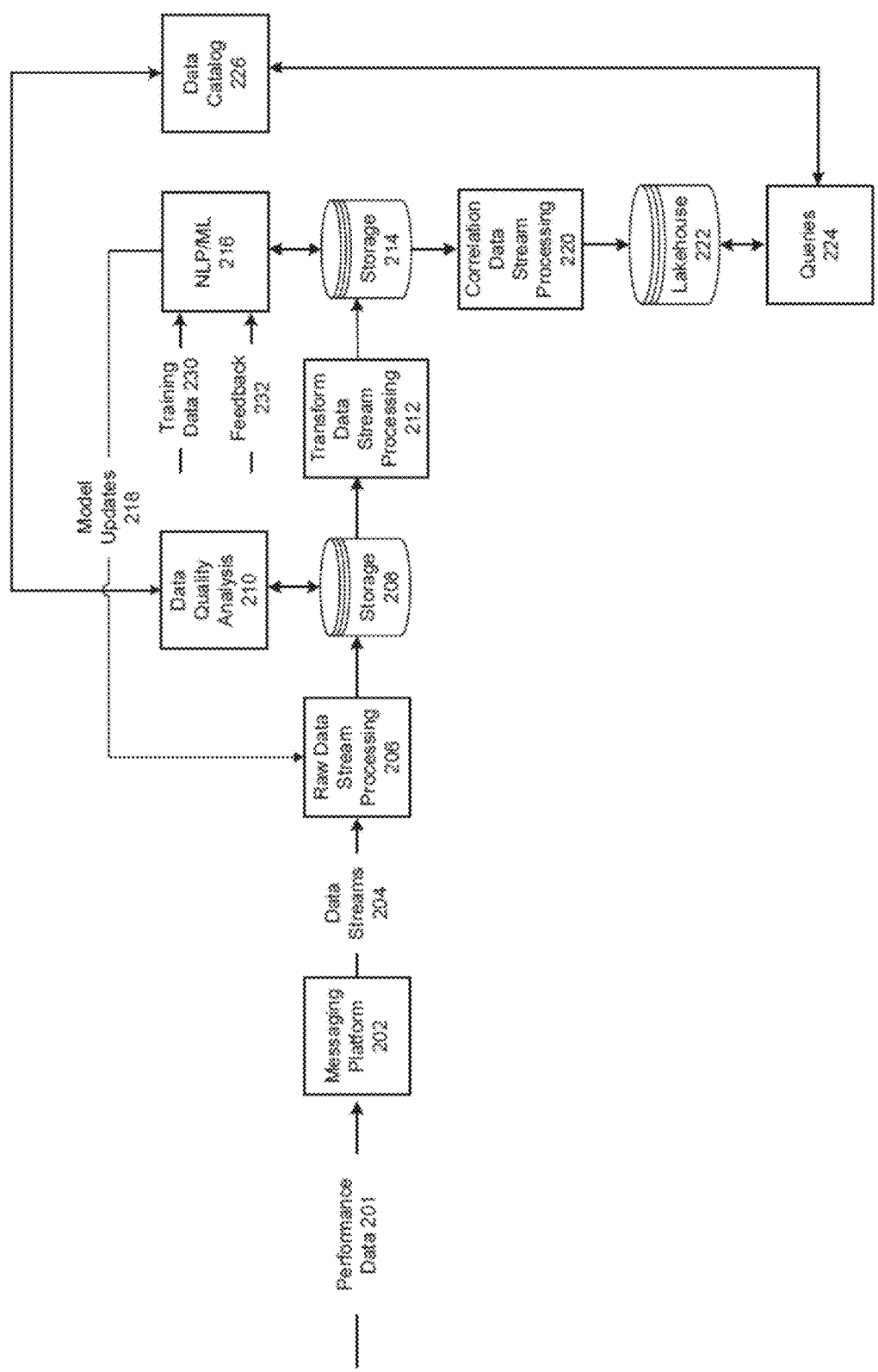
FIG. 2 is an exemplary technology stack for network analysis in accordance with one embodiment.

FIG. 2 is an exemplary technology stack 200 for network analysis.

Referring to FIG. 2, the technology stack 200 may represent the network analytics model 106 of FIG. 1, and may include a messaging platform 202 with which to receive network performance data 201 (e.g., as shown further in FIG. 3). The messaging platform 202 may be a distributed publish-subscribe messaging system and messaging queue for large volumes of data. The technology stack 200 may receive raw data streams 204 of the performance data 110 from the messaging platform 202, and using raw data stream processing 206 may process the raw performance data, which may be stored (e.g., in storage 208). The stored raw data may be analyzed by a data quality analysis module 210, which may evaluate the raw data for completeness, maximums, and correlation. The raw data that meets the data quality metrics used by the data quality analysis module 210 for analysis may be stored, and may be used for transform data stream processing 212. The transform data stream processing 212 may transform the data from the stream (e.g., using transformations such as mapping, filtering, altering the number of repartitions, aggregating elements of a data stream, and the like).

The transformed data stream data may be stored (e.g., in storage 214), and may be analyzed using natural language processing (NLP) and machine learning (ML) 216. For example, NLP may be applied to textual data from the data streams (e.g., syslog data). The textual data may not be considered a performance metric by some existing systems, but the NLP may generate performance metrics based on the textual data. For example, the NLP may use ML (e.g., deep learning) to tokenize words and sentences identified in the performance data. The NLP may extract features from the text (e.g., vector representations of the text). The features may be inputs to a ML model that may generate performance metrics for the network performance data 201 based on the features of the text. In this manner, the NLP and ML 216 may generate network performance metrics that may not be considered by existing systems that may analyze network performance data. The NLP and ML 216 may update its model and provide model updates 218 to the raw data stream processing 206 to use in analyzing the raw performance data. For example, the NLP may interpret log messages and time series analysis techniques to correlate signals (e.g., from messages or quantitative measurements) with known abnormal network behavior (e.g., known from training data and/or learned) to identify causality.

The technology stack 200 may use correlation data stream processing 220 to correlate the performance data 110. The correlated performance data may be stored in a lakehouse storage 222. The topology stack 200 may generate queries 224 (e.g., a service that runs queries) to components such as a baseline, a global core, QoS, network capacity management, carrier correlation, routing, and healing. The queries 224 may be sent to a data catalog 226, and used by the data quality analysis module 210.

The technology stack 200 may be horizontally scalable, and edge compute-capable. A cloud-based environment may implement the technology stack 200.

The technology stack 200 may use supervised or semi-supervised machine learning. For example, the network analytics model using NLP and ML 216 may be trained 230 to emphasize certain network performance metrics over other network performance metrics, and the metrics for certain network nodes and other equipment over others. However, as network use changes, some network performance metrics may become more important to analyze than others, and some network resources may be more prone to performance issues than others, resulting in a need to re-prioritize network analysis on-the-fly. For example, more remotely working employees may result in increased network performance issues in network resources that previously did not experience many performance issues. A cloud transition may change workload and utilization metrics, and may affect network capacity management. An automated system may monitor all routers of a network, but may not identify the most important routers to monitor at a given time. The training data 230 may indicate whether certain performance metrics are indicative of performance issues or not, whether some performance metrics may correlate to other performance metrics, root causes of some performance metrics, and may provide remediation options that correspond to particular performance issues. Feedback 232 may be provided to update the model (e.g., the parameters used to tokenize words and sentences and extract features from text, the threshold values used to differentiate between acceptable performance and performance issues, the recommended remediation options, etc.). For example, the feedback 232 may indicate whether an identified performance issue actually was a performance issue or not, whether the performance issue was related to another issue (e.g., a planned outage), whether the identified root cause of a performance issue was correct or not, and whether a remediation action taken in response to a performance issue fixed the issue and/or was approved by a user.

FIG. 3 illustrates example data and functions for a network analysis environment.

As shown in the center of FIG. 3, a centralized networks analytics model (e.g., corresponding to the centralized networks analytics model 106 of FIG. 1) may collect a variety of data from multiple sources, and may analyze the data as network performance data. The analysis of the network performance data may facilitate a variety of services.

The centralized networks analytics model 106 may perform data management 308. For example, the centralized networks analytics model 106 may analyze and generate compliance data 310, curated data 312 (e.g., extract, load, and transform processes 314, data access 316, data quality 318, and pipeline monitoring 320), and inventory 322 (e.g., network topology 324 and metadata 326, including provider 328 and equipment 330 metadata).

The centralized networks analytics model 106 may assess provider performance 332, such as baseline metrics 334, performance reporting 336, and remediation analytics 338. The baseline metrics 334 may be used to identify performance metric deviations that may be indicative of performance issues, for example.

The centralized networks analytics model 306 may analyze and generate network health data 340, such as baseline network health 342, QoS 344, service compliance 346, and device health 348. Device health 348 may include device configuration data 350, errors/discards 352, performance history 354, and utilization 356. QoS 344 may include protocol flapping 358, interface flapping 360, jitter 362, packet loss 364, utilization 366, mean opinion scores (MOS) 368, and latency 370. The baseline data 342 may establish the normal network health performance against which the centralized networks analytics model 106 may compare ingested performance data. The QoS 344 may set thresholds and ranges for performance measures. For example, when the latency 370 or packet loss 364 is too high for the QoS 344, such may indicate a performance issue.

The centralized networks analytics model 106 may provide automation services 371, such as alerts 372, incident management data 373, network interface data 374, ebonding 375, and device operational status 376. For example, automated alerts 372 may indicate performance issues. A device operational status 376 may indicate whether a network device is active or inactive, disconnected, in standby mode, or the like. For example, an inactive or disconnected device may indicate a performance issue. Incident management data 373 may identify performance issues that have occurred and any remedies applied.

The centralized networks analytics model 106 may generate operations use cases 377. The centralized networks analytics model 106 may identify operations use cases 377 that may be reusable. The centralized networks analytics model 106 may test, develop, and standardize operations use cases 377 that can apply to multiple users to automate monitoring and remediation processes. The operations use cases 377 may apply to flap monitoring 378, lifecycle monitoring 379, capacity management 380, loss of redundancy 381, maintenance monitoring 382, provider outage correlation 383, service level agreement violations 384, provider scorecards 385, and audit data automation 386, for some examples. In one example, an operational use case may include routing data away from a particular circuit or set of devices. When any user's network performance data exhibits similarities to performance data whose remediation was the routing away operational use case, then the operational use case may be applied to the user. Remediation actions taken for an operational use case may be applied or to or recommended for a similar situation, allowing for replication and automation across multiple users.

The centralized networks analytics model 106 may perform security analysis 387, for example, to identify security threats based on failed logins 388, user access 389 (e.g., improper or unusual user access of certain resources), anomaly detection 390 (e.g., actions out of the ordinary course, high or low numbers of certain actions, etc.), and attacks 391, such as distributed denial of service, etc.). For example, anomalies 390 may be based on feature extraction, such as types of actions, locations of actions, users who performed actions, and the like. Large clusters of similar features may indicate an anomaly 390 that may be indicative of a performance issue or may represent a root cause of a performance issue.

To detect anomalies, the centralized networks analytics model 106 may identify known pathological network behavior. Pathological network behavior may be known based on training data and/or learned anomalous behavior. The centralized networks analytics model 106 may compare detected or predicted performance issues with the identified pathological events to determine that a performance issue is indicative of an anomaly.

Figure 4:
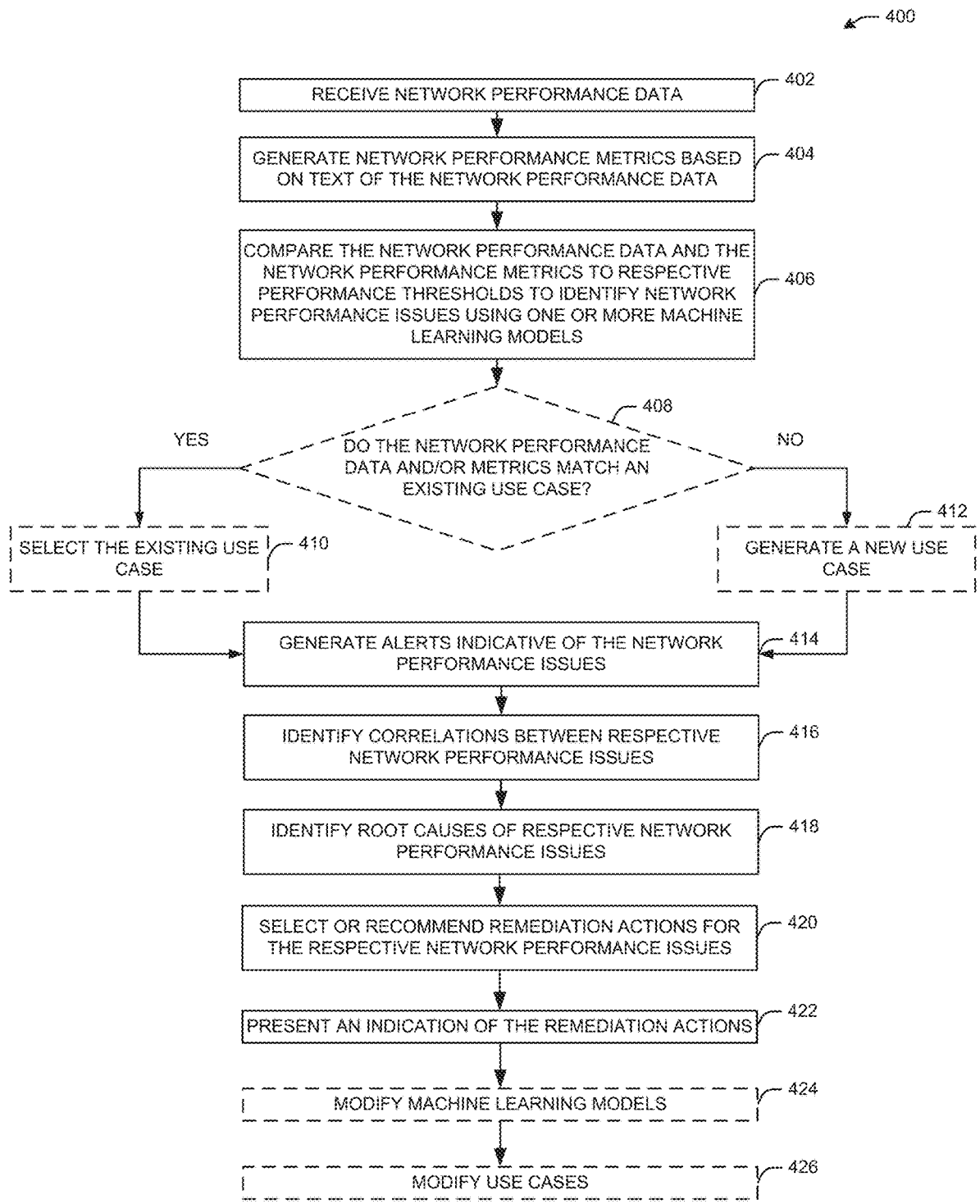
FIG. 4 is a flowchart illustrating a process for network analysis and remediation in accordance with one embodiment.

FIG. 4 is a flowchart illustrating a process 400 for network analysis and remediation in accordance with one embodiment.

At block 402, a device (or system, e.g., the networks analytics model 106 of FIG. 1) may receive network performance data from a variety of sources (e.g., syslog data, network configuration data, performance data, etc.). The network performance data may be received as continuous or near-continuous streams of large volumes of data from one or more networks (e.g., network circuits and associated nodes/devices, etc.). A user may sign into (e.g., authenticate to) the device, and the device may identify the network resources used by the authenticated user (e.g., the network circuits, devices, transmitted data, etc.). The network performance data may be received by a messaging service/queue (e.g., see FIG. 2) that may process streams of the network performance data. The messaging queue may be capable of processing and queueing a large volume of data, and may generate messages to be sent as data streams to a data stream processor of the device.

At block 404, the device may generate network performance metrics from the network performance data. For example, some of the network performance data may include quantitative values indicative of network performance (e.g., packet loss, latency, jitter, flapping, usage, capacity, etc.). Some of the network performance data may be textual, such as syslog data. The textual data may be input to a NLP using ML to generate quantitative values used as the network performance metrics. In this manner, even non-quantitative values of the network performance data may result in network performance metrics to analyze.

At block 406, the device may identify network performance issues by comparing the network performance data and metrics to respective thresholds. For example, the network performance data and/or metrics may indicate that a device is off or disconnected, that network usage is higher than or lower than a respective threshold associated with normal/expected usage, that packet loss is higher than an acceptable threshold, that an outage has occurred, and the like. The performance thresholds used to evaluate some metrics may be set based on training data, SLAs and QoS requirements, baseline metrics provided or generated by the device, or the like, and may be adjusted based on learned usage at respective times and/or based on feedback indicating whether certain data are indicative of a performance issue.

At block 408, the device optionally may evaluate the network performance data and/or metrics for a match with an existing use case. Use cases may be generated to define criteria (e.g., threshold values) for certain performance metrics, emphasis of certain metrics over others (e.g., based on which performance metrics most strongly correlate to a performance issue, etc.), and remediation options (e.g., based on selected remediation options and feedback regarding the outcome of the remediation options). When the performance data and/or metrics match those of a known performance issue, the use case for the known performance issue may be selected at block 410, resulting in an identification of the root cause and/or a selection of a remediation action based on the remediation applied to the known performance issue (e.g., what has worked in the past to solve a similar issue). When the performance data and/or metrics do not match any existing use cases, the device at block 412 may generate a new use case to test and implement for future analysis of network performance data.

At block 414, when a network performance issue has been identified, the device may generate alerts to identify the performance issue. The alerts may indicate the performance issue, the criteria used to identify the performance issue, and/or a severity associated with the performance issue.

At block 416, the device may identify correlations between respective network performance issues. Because multiple network resources may experience the same or similar performance issues (e.g., multiple nodes experience higher or lower than usual traffic), the device may generate alerts indicative of a common problem. When the performance issues are related (e.g., multiple nodes in a given geographic area experience the same performance issue), the device may determine a correlation between the performance issues (e.g., determine that the performance issues are related). Similarly, a network resource may experience multiple performance issues. For example, a network resource may experience heavy traffic and increased latency or packet loss. Such performance issues may be separate, or may be related to a common root cause. By identifying correlations, the device may avoid redundant notifications to a user, and may avoid redundant analysis of a same problem or multiple problems related to a same cause.

At block 418, the device may identify root causes for respective network performance issues. For example, the increased traffic and packet loss of a network resource both may be caused by a same issue, such as increased user demand of a network circuit, re-routing of traffic, or the like. In another example, multiple network resources may experience the increased traffic and packet loss, so the root cause of the issues at the multiple network resources may be the same increased user demand of a network circuit, re-routing of traffic, or the like. In another example, multiple network resources may be disconnected, and there may be a known outage of a provider or otherwise that may be the root cause. In this manner, rather than simply notifying a user that a problem exists (e.g., devices offline, increased packet loss, poor latency, etc.), the device may identify the root causes (e.g., planned outage, weather-related outage, re-routing, change in packet prioritization, increased remote users working from home, attempted security attack, etc.). The root causes may be identified by evaluating performance metrics that may be related to other performance metrics (e.g., when latency is high, evaluate network usage, device status, etc.), and/or by relying on known root causes (e.g., based on existing use cases).

At block 420, the device may select or recommend remediation actions for the respective network performance issues. The remediation actions may be selected based on previously selected and effective remediation actions, such as those included in an existing use case, training data (e.g., select action X for issue Y), and/or learned outcomes of remediation actions (e.g., whether a remediation action resolved the issue). For example, remediation may include re-routing traffic, prioritizing certain traffic, activating or de-activating network resources, modifying user roles and responsibilities, modifying network paths, and the like. In one example, if a network circuit is to be turned off or is to be offline or experiencing heavy traffic at a given time, a selected or recommended action may be to activate a backup network circuit, or to use another communication method to account for a temporary lack of usage of network resources for at least some users.

At block 422, the device may present an indication of any remediation actions taken or recommended. For example, the device may generate notifications indicating that a remediation action was taken in response to one or more performance issues identified, the root causes, and/or the outcome/result of the remediation action. The notifications may include recommended remediation actions for a user to select. The recommended actions may be actions that, when selected by a user, are implemented automatically by the device. Alternatively the recommended actions may be actions that a user may implement outside of the device and its controlled network resources.

At block 424, optionally, the device may modify machine learning models used to identify performance issues, root causes, correlations, use cases, and remediation actions. The modifications may include adjusting performance thresholds, changing the emphasis (e.g., weighting) of certain metrics (e.g., higher emphasis indicating a higher correlation between a metric and its relationship/indication of a performance issue), updating the remediation actions to recommend or select for a performance issue, updating relationships between metrics to use in identifying correlations (e.g., recognizing that high usage and increased latency may be related), and the like.

At block 426, optionally, the device may modify existing use cases. The use cases may be standardized (e.g., "turnkey") cases that may apply to multiple users and/or performance issues. The device may test use cases against different performance metrics to identify applicability, and to generate new use cases that are modified versions of existing use cases. The device may modify an existing use case based on feedback, for example, regarding whether a use case was properly applied to an identified performance issue (e.g., whether the remediation action for the use case resolved the performance issue). The modifications may include adjusting the evaluation criteria (e.g., the particular performance metrics triggering the selection of the use case), the root causes, and/or the remediation actions selected or recommended.

It is understood that the above descriptions are for purposes of illustration and are not meant to be limiting.

Figure 5:
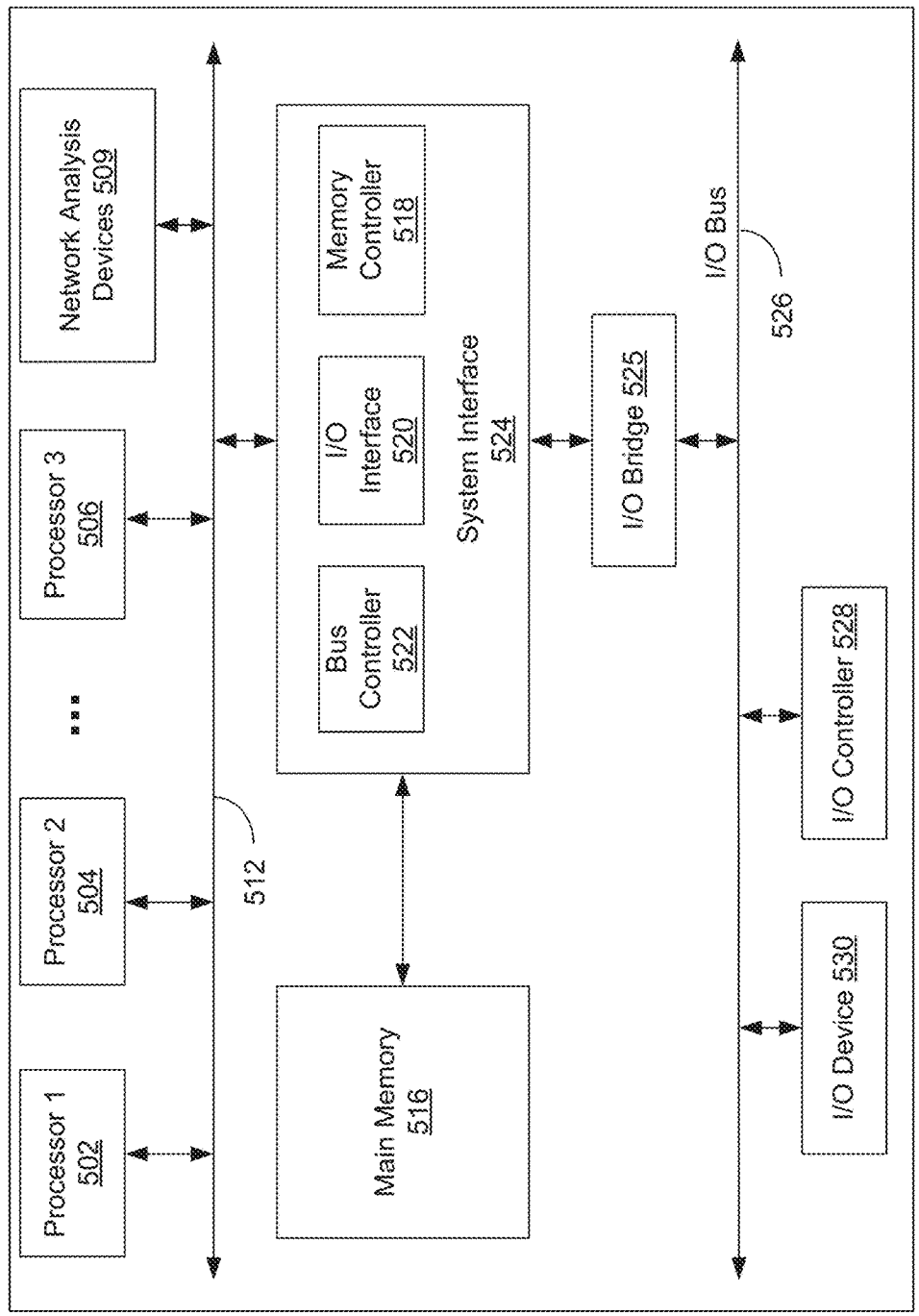
FIG. 5 is a diagram illustrating an example of a computing system that may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may represent at least a portion of the network analysis model shown in FIG. 1 and discussed above. The computer system (system) includes one or more processors 502-506 and one or more network analysis devices 509 (e.g., representing at least a portion of the network analysis model shown in FIG. 1, capable of performing any operations described with respect to FIGS. 1-4). Processors 502-506 may include one or more internal levels of cache (not shown) and a bus controller 522 or bus interface unit to direct interaction with the processor bus 512. Processor bus 512, also known as the host bus or the front side bus, may be used to couple the processors 502-506 with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown). System interface 524 may also include an input/output (I/O) interface 520 to interface one or more I/O bridges 525 or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for detecting and remediating network performance issues, the method comprising:
    receiving, at a network analytics machine learning model, network performance data comprising system log data and network configuration data;
    generating, by the network analytics machine learning model, using natural language processing, network performance metrics based on text of the system log data;
    determining, by the network analytics machine learning model, based on a comparison of the network performance metrics to training data input to the network analytics machine learning model, that the network performance metrics fail to satisfy a performance threshold;
    generating, by the network analytics machine learning model, an alert indicative of the network performance metrics failing to satisfy the performance threshold;
    identifying, by the network analytics machine learning model, a root cause of the network performance metrics failing to satisfy the performance threshold, the network performance metrics associated with a first network resource, and the root cause associated with a second network resource;
    selecting, by the network analytics machine learning model, a remediation action associated with modifying the second network resource;
    modifying, by the network analytics machine learning model, the second network resource based on the selection;
    generating, by the network analytics machine learning model, a use case associated with the network performance metrics, the use case comprising the root cause and the remediation action; and
    presenting, by the network analytics machine learning model, an indication that the remediation action was selected.

2. The method of claim 1, further comprising:
    receiving, at the network analytics machine learning model, second network performance data comprising system log data and second network configuration data;
    determining, by the network analytics machine learning model, that the network performance data satisfies one or more criteria;
    determining, by the network analytics machine learning model, that the second network performance data fails to satisfy one or more criteria;
    sending, by the network analytics machine learning model, the network performance data as data stream inputs to a natural language processing layer of the network analytics machine learning model based on the determination that the network performance data satisfies one or more criteria; and refraining from sending, by the network analytics machine learning model, the second network performance data as data stream inputs to the natural language processing layer of the network analytics machine learning model based on the determination that the second network performance data fails to satisfy the one or more criteria.

3. The method of claim 1, further comprising:
receiving, at the network analytics machine learning model, second network performance data comprising system log data and second network configuration data;
selecting, by the network analytics machine learning model, based on a comparison of the second network performance data to the use case, the use case as a response to the second network performance data;
selecting, by the network analytics machine learning model, the remediation action based on the selection of the use case; and
modifying, by the network analytics machine learning model, the second network resource based on the selection of the use case.

4. The method of claim 1, wherein the network performance data are received at an edge device of a network, the method further comprising:
authenticating, by the network analytics machine learning model, a user; and
identifying, by the edge device, based on the authentication, network resources from which to receive the network performance data, the network resources comprising the first network resource and the second network resource.

5. The method of claim 1, wherein the training data comprise the performance threshold, the method further comprising:
modifying, by the network analytics machine learning model, the performance threshold;
receiving, at the network analytics machine learning model, second network performance data comprising system log data and second network configuration data; and
determining, by the network analytics machine learning model, based on a comparison of the second network performance data to the modified performance threshold, that the second network performance data satisfies the modified performance threshold.

6. The method of claim 1, further comprising:
modifying, by the network analytics machine learning model, the use case, wherein the modification comprises at least one of modifying the root cause or the remediation action.

7. The method of claim 1, further comprising:
receiving, at the network analytics machine learning model, second network performance data comprising system log data and second network configuration data;
determining, by the network analytics machine learning model, that the second network performance data fails to satisfy the performance threshold;
identifying, by the network analytics machine learning model, a correlation between the network performance metrics and the second network performance data failing to satisfy the performance threshold; and
determining, by the network analytics machine learning model, based on the correlation, that the root cause is associated with the second network performance data.

8. A system for detecting and remediating network performance issues, the system comprising at least one processor coupled to memory, the at least one processor configured to:
receive, using a messaging queue, network performance data comprising system log data and network configuration data;
generate, using natural language processing, network performance metrics based on text of the system log data;
determine, using a machine learning model, based on a comparison of the network performance metrics to training data input to the machine learning model, that the network performance metrics fail to satisfy a performance threshold;
generate, using the machine learning model, an alert indicative of the network performance metrics failing to satisfy the performance threshold;
identify, using the machine learning model, a root cause of the network performance metrics failing to satisfy the performance threshold, the network performance metrics associated with a first network resource, and the root cause associated with a second network resource;
select, using the machine learning model, a remediation action associated with modifying the second network resource;
modify the second network resource based on the selection;
generate a use case associated with the network performance metrics, the use case comprising the root cause and the remediation action; and
present an indication that the remediation action was selected.

9. The system of claim 8, wherein the at least one processor is further configured to:
receive, using the messaging queue, second network performance data comprising system log data and second network configuration data;
determine, using the machine learning model, that the network performance data satisfies one or more criteria;
determine, using the machine learning model, that the second network performance data fails to satisfy one or more criteria;
send the network performance data as data stream inputs to a natural language processing layer of the machine learning model based on the determination that the network performance data satisfies one or more criteria; and
refrain from sending the second network performance data as data stream inputs to the natural language processing layer of the machine learning model based on the determination that the second network performance data fails to satisfy the one or more criteria.

10. The system of claim 8, wherein the at least one processor is further configured to:
receive, using the messaging queue, second network performance data comprising system log data and second network configuration data;
select, using the machine learning model, based on a comparison of the second network performance data to the use case, the use case as a response to the second network performance data;
select, using the machine learning model, the remediation action based on the selection of the use case; and
modify, using the machine learning model, the second network resource based on the selection of the use case.

11. The system of claim 8, wherein the network performance data are received at an edge device of a network, wherein the at least one processor is further configured to:
   authenticate a user; and
   identify, based on the authentication, network resources from which to receive the network performance data, the network resources comprising the first network resource and the second network resource.

12. The system of claim 8, wherein the training data comprise the performance threshold, and wherein the at least one processor is further configured to:
   modify, using the machine learning model, the performance threshold;
   receive, using the messaging queue, second network performance data comprising system log data and second network configuration data; and
   determine, using the machine learning model, based on a comparison of the second network performance data to the modified performance threshold, that the second network performance data satisfies the modified performance threshold.

13. The system of claim 8, wherein the at least one processor is further configured to:
   modify, using the machine learning model, the use case, wherein the modification comprises at least one of modifying the root cause or the remediation action.

14. The system of claim 8, wherein the at least one processor is further configured to:
   receive, using the messaging queue, second network performance data comprising system log data and second network configuration data;
   determine, using the machine learning model, that the second network performance data fails to satisfy the performance threshold;
   identify, using the machine learning model, a correlation between the network performance metrics and the second network performance data failing to satisfy the performance threshold; and
   determine, using the machine learning model, based on the correlation, that the root cause is associated with the second network performance data.

\* \* \* \* \*